United States Patent
Murakami et al.

(10) Patent No.: US 8,380,263 B2
(45) Date of Patent: Feb. 19, 2013

(54) MOBILE TERMINAL DEVICE WITH SLIDING DISPLAY AND METHOD THEREOF

(75) Inventors: Kouki Murakami, Kawasaki (JP);
Tatsuhito Araki, Kawasaki (JP);
Hiroaki Sakashita, Kawasaki (JP);
Takashi Suzuki, Kawasaki (JP);
Hiroaki Matsuda, Kawasaki (JP);
Takehisa Ishikawa, Kawasaki (JP);
Hidehiko Hizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 12/874,217

(22) Filed: Sep. 1, 2010

(65) Prior Publication Data

US 2011/0211324 A1   Sep. 1, 2011

(30) Foreign Application Priority Data

Sep. 2, 2009  (JP) .................. 2009-202966

(51) Int. Cl.
*H04M 1/00*   (2006.01)
*H05K 5/00*   (2006.01)
(52) U.S. Cl. .................. 455/575.4; 361/679.01
(58) Field of Classification Search ............ 361/679.01; 29/428; 292/32; 455/575.4
See application file for complete search history.

(56) References Cited

U.S. PATENT DOCUMENTS

| | | | | |
|---|---|---|---|---|
| 5,708,561 A * | 1/1998 | Huilgol et al. | ........... | 361/679.07 |
| 6,229,693 B1 * | 5/2001 | Karidis et al. | ........... | 361/679.05 |
| 6,504,707 B2 * | 1/2003 | Agata et al. | ............... | 361/679.05 |
| 6,522,529 B1 * | 2/2003 | Huilgol et al. | ........... | 361/679.06 |
| 6,822,871 B2 * | 11/2004 | Lee et al. | ..... | 361/727 |
| 7,054,145 B2 * | 5/2006 | Tanaka et al. | ............ | 361/679.21 |
| 7,082,028 B2 * | 7/2006 | Huilgol et al. | ........... | 361/679.07 |
| 7,157,648 B2 * | 1/2007 | Park | ............. | 174/481 |
| 7,835,145 B2 * | 11/2010 | Chiang et al. | ............ | 361/679.27 |
| 7,869,196 B2 * | 1/2011 | Itoh | .......... | 361/679.01 |
| 2009/0137293 A1 * | 5/2009 | Yoo et al. | .................. | 455/575.4 |
| 2009/0209305 A1 * | 8/2009 | Lee et al. | .................. | 455/575.4 |
| 2010/0035670 A1 * | 2/2010 | Mine | ......................... | 455/575.4 |
| 2010/0048249 A1 * | 2/2010 | Furuta et al. | ................. | 455/566 |
| 2010/0142160 A1 * | 6/2010 | Huang et al. | ................. | 361/748 |
| 2010/0151909 A1 * | 6/2010 | Zhou | .............................. | 455/563 |
| 2011/0032692 A1 * | 2/2011 | Niederkorn et al. | ........ | 361/818 |
| 2011/0317343 A1 * | 12/2011 | Shin et al. | ............... | 361/679.01 |

FOREIGN PATENT DOCUMENTS

| | | |
|---|---|---|
| JP | 2002-023671 | 1/2002 |
| JP | 2007-208338 | 8/2007 |
| JP | 2008-113101 | 5/2008 |

OTHER PUBLICATIONS

Japanese Office Action mailed Nov. 20, 2012 for corresponding Japanese Application No. 2009-202966, with English-language translation.

* cited by examiner

*Primary Examiner* — Lisa Lea Edmonds
(74) *Attorney, Agent, or Firm* — Fujitsu Patent Center

(57) ABSTRACT

A mobile terminal device includes a display unit having a first engaging latch, a case having a slide groove that allows the first engaging latch to slide therein and a second engaging latch that engages the first engaging latch that slides in the slide groove, and a component located in a gap that appears between the case and the display unit as a result of sliding the first engaging latch in the slide groove.

10 Claims, 15 Drawing Sheets

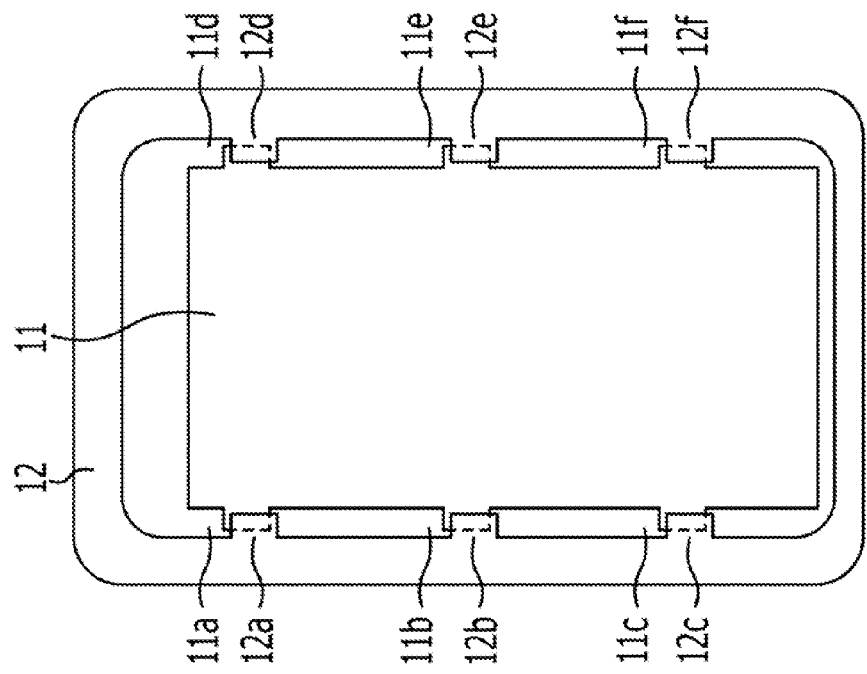
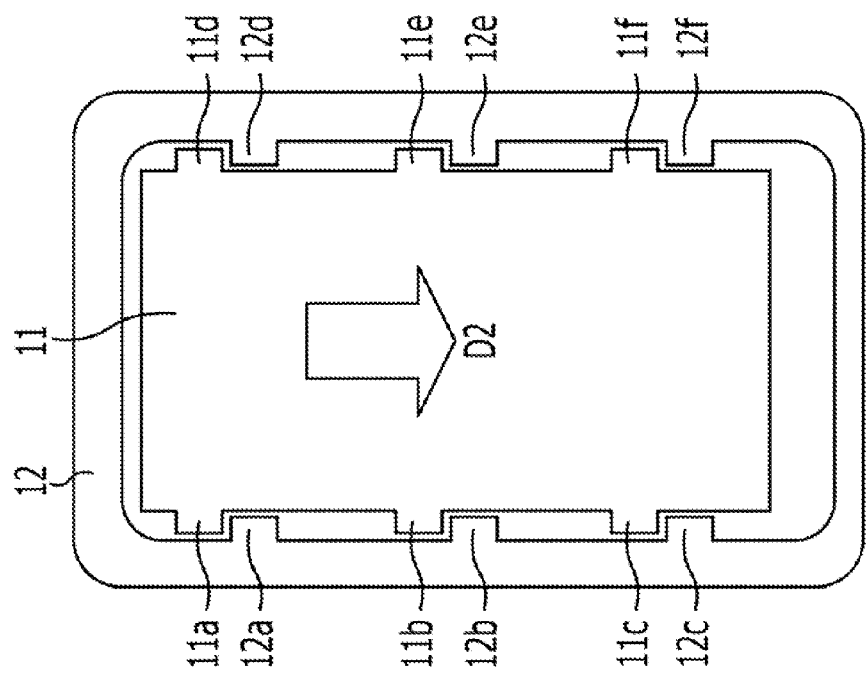

RELATED ART

RELATED ART

RELATED ART

RELATED ART

MOBILE TERMINAL DEVICE WITH SLIDING DISPLAY AND METHOD THEREOF

CROSS-REFERENCE TO RELATED APPLICATIONS

This application is based upon and claims the benefit of priority of the prior Japanese Patent Application No. 2009-202966, filed on Sep. 2, 2009, the entire contents of which are incorporated herein by reference

FIELD

The present invention relates to a mobile terminal device.

BACKGROUND

A display unit such as an LCD (Liquid Crystal Display) is mounted to a mobile terminal device such as a mobile phone (see Japanese Laid-open Patent Publication No. 2008-113101). FIG. 12 is an external perspective front view of an existing mobile phone. FIG. 12 illustrates one example of the existing mobile phone. The existing mobile phone 9 illustrated in FIG. 12 has a movable side housing 90 having a display unit. The movable side housing 90 has an LCD module 91 and a case 92. In the example illustrated in FIG. 12, the LCD module 91 is mounted to the case 92.

With reference to FIG. 13, the following will describe an existing method of mounting the LCD module 91 to the case 92. FIG. 13 is a view for illustrating one example of an existing method of mounting the LCD module 91 to the case 92. As illustrated in FIG. 13, the LCD module 91 and the case 92 have engaging latches for engaging both of them. The engaging latch of the LCD module 91 may be referred to as "LCD side engaging latch". The engaging latch of the case 92 may be referred to as "case side engaging latch". In the example illustrated in FIG. 13, the LCD module 91 has an LCD side engaging latch 91a. The case 92 has case side engaging latches 92a and 92b. The LCD module 91 also has an LCD side engaging latch at a position corresponding to the case side engaging latch 92b. The LCD module 91 has a plurality of LCD side engaging latches. The case 92 has a plurality of case side engaging latches.

Such an LCD module 91 is mounted to the case 92 by being pressed into the case 92. For example, in the example illustrated in FIG. 13, the LCD module 91 is put on an upper surface of the case 92, and then press-fitted into the case 92 in a direction D91 from a surface of the LCD module 91. The LCD module 91 is mounted to the case 92 by the LCD side engaging latch 91a moving past the case side engaging latch 92a such that the LCD side engaging latch 91a engages the case side engaging latch 92a.

There is a proposal for a method of sliding a sub-display unit, which is a second display unit of a mobile phone, into a case called a guide part, thereby mounting the sub-display unit to the case (see Japanese Laid-open Patent Publication No. 2007-208338). It is thought that an operation for mounting the sub-display unit to the case is facilitated by this method. The sub-display unit may be referred to as sub-display or back display.

However, an existing method using engaging latches has a problem that a display unit may be broken. FIG. 14 is a cross-sectional view taken along the line III-III, as seen from an arrow B1 in FIG. 12. The LCD module 91 illustrated in FIG. 12 has the LCD side engaging latch 91a at a portion indicated by the line III-III, and the case 92 illustrated in FIG. 12 has the case side engaging latch 92a at a portion indicated by the line III-III. FIG. 14 illustrates a state where the LCD module 91 is press-fitted into the case 92.

As illustrated in FIG. 14, when the LCD module 91 is press-fitted into the case 92, the LCD side engaging latch 91a is pressed and moved inwardly by the case side engaging latch 92a. When moving past the case side engaging latch 92a, the LCD side engaging latch 91a receives inward stress. At this time, the LCD module 91 is deformed into an arcuate shape as illustrated FIG. 14, and thus may be broken. When the LCD side engaging latch 91a is pressed and moved inwardly, an edge portion E91 of the LCD module 91 receives stress, and thus is likely to be broken.

It is also conceived that an LCD module 91, which is a main display unit, is mounted to a movable side housing by using the above method of sliding the sub-display unit to be mounted to the case. However, the method of sliding the LCD module 91 to be mounted to the case 92 has a problem that a mobile phone is increased in size. FIGS. 15A and 15B are cross-sectional views taken along the line II-II, as seen from an arrow B2 in FIG. 12. As illustrated in FIG. 15A, the case 92 receives the LCD module 91, a board 93, a GPS (Global Positioning System) frame 94, a panel 97, and the like.

When the LCD module 91 is slid to be mounted to the case 92, a slide region for sliding the LCD module 91 is provided in the case 92 as illustrated in FIG. 15B. In order to secure the slide region, the movable side housing 90 (illustrated in FIG. 12) is lengthened in the slide direction. In the field of mobile phones, reduction of housing in size is a common challenge. Thus, it is not desirable that the movable side housing 90 is increased in size.

SUMMARY

According to an aspect of the invention, a mobile terminal device includes a display unit having a first engaging latch, a case having a slide groove that allows the first engaging latch to slide therein and a second engaging latch that engages the first engaging latch that slides in the slide groove, and a component located in a gap that appears between the case and the display unit as a result of sliding the first engaging latch in the slide groove.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 7A and 7B are views for illustrating the exemplary method of mounting the LCD module to the case;

DESCRIPTION OF EMBODIMENTS

An embodiment of a mobile terminal device disclosed in the present application will be described in detail based on the drawings. The mobile terminal device disclosed in the present application is not limited to this embodiment. For example, although the mobile terminal device disclosed in the present application is applied to a mobile phone in the following embodiment, the mobile terminal device disclosed in the present application is also applicable to mobile terminal devices such as PDAs (Personal Digital Assistants).

Figure 1:
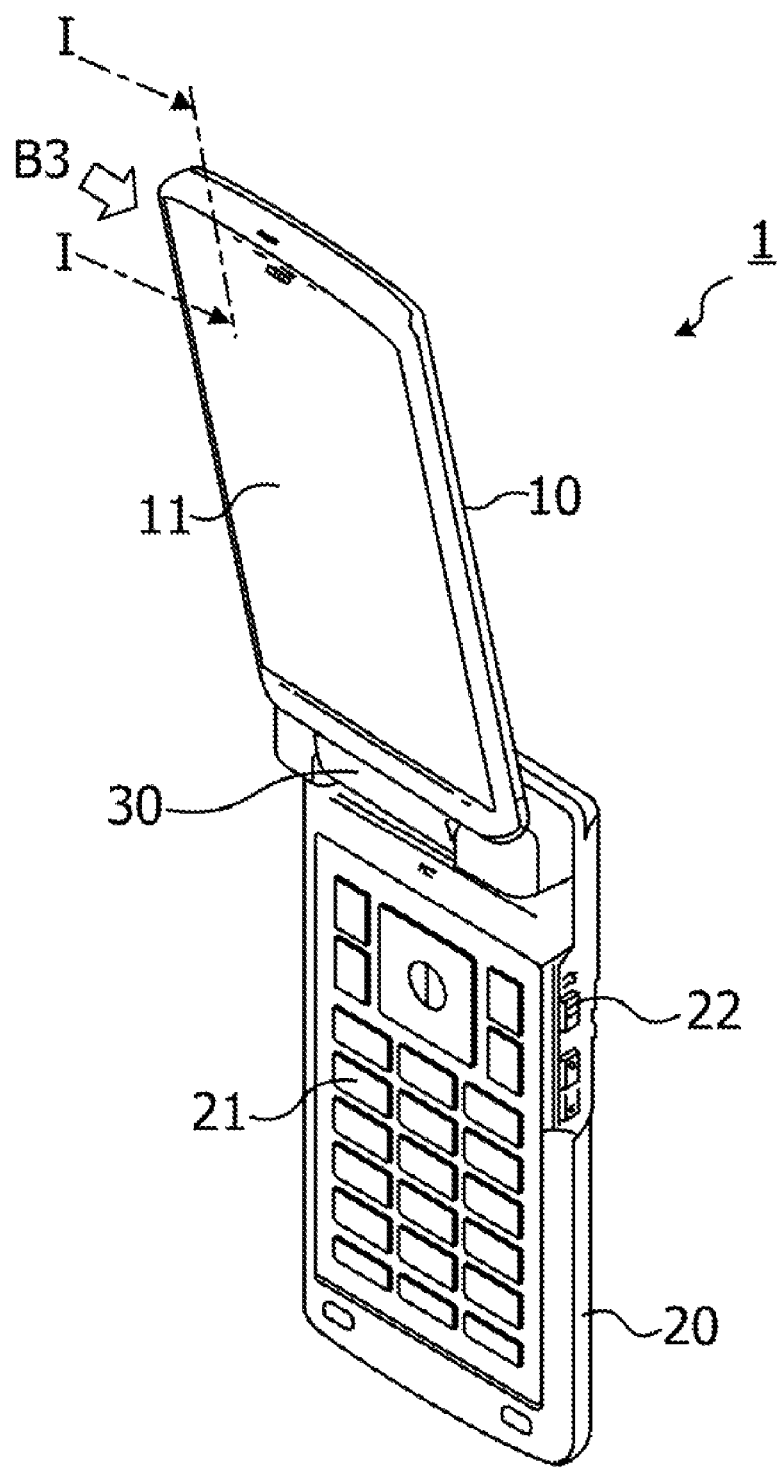
FIG. 1 is an external perspective front view of an exemplary mobile phone according to an embodiment.
Figure 2:
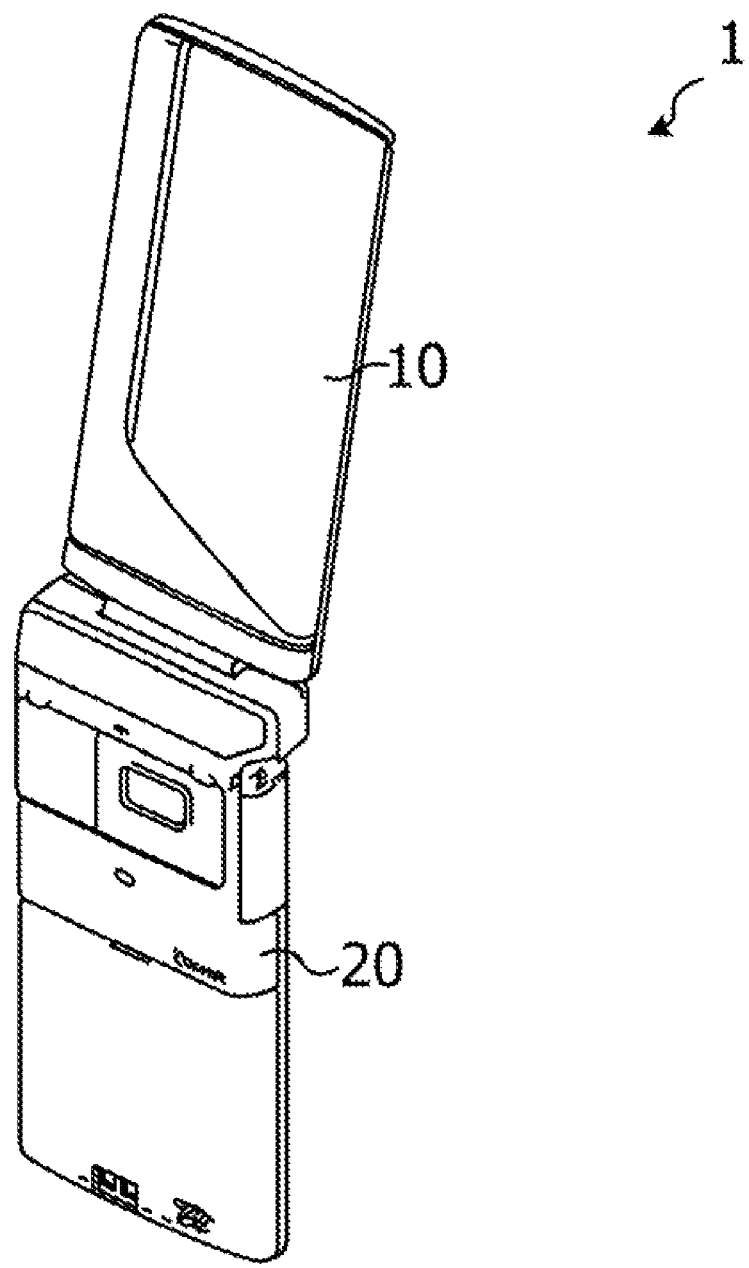
FIG. 2 is an external perspective back view of the exemplary mobile phone according to the embodiment.

With reference to FIGS. 1 and 2, the following will describe an appearance of the mobile phone according to the embodiment. FIG. 1 is an external perspective front view of the mobile phone according to the embodiment. FIG. 2 is an external perspective back view of the mobile phone according to the embodiment.

The mobile phone 1 illustrated in FIGS. 1 and 2 is a foldable mobile phone having a movable side housing 10 and a fixed side housing 20. The movable side housing 10 and the fixed side housing 20 are connected to each other via a connection part 30. The movable side housing 10 has an LCD module 11. The fixed side housing 20 has an operation part 21 and various side keys 22. The movable side housing 10 and the fixed side housing 20 are formed in a box shape from a lightweight and high-strength material such as a magnesium alloy, although other shapes and materials may be used.

Figure 3:
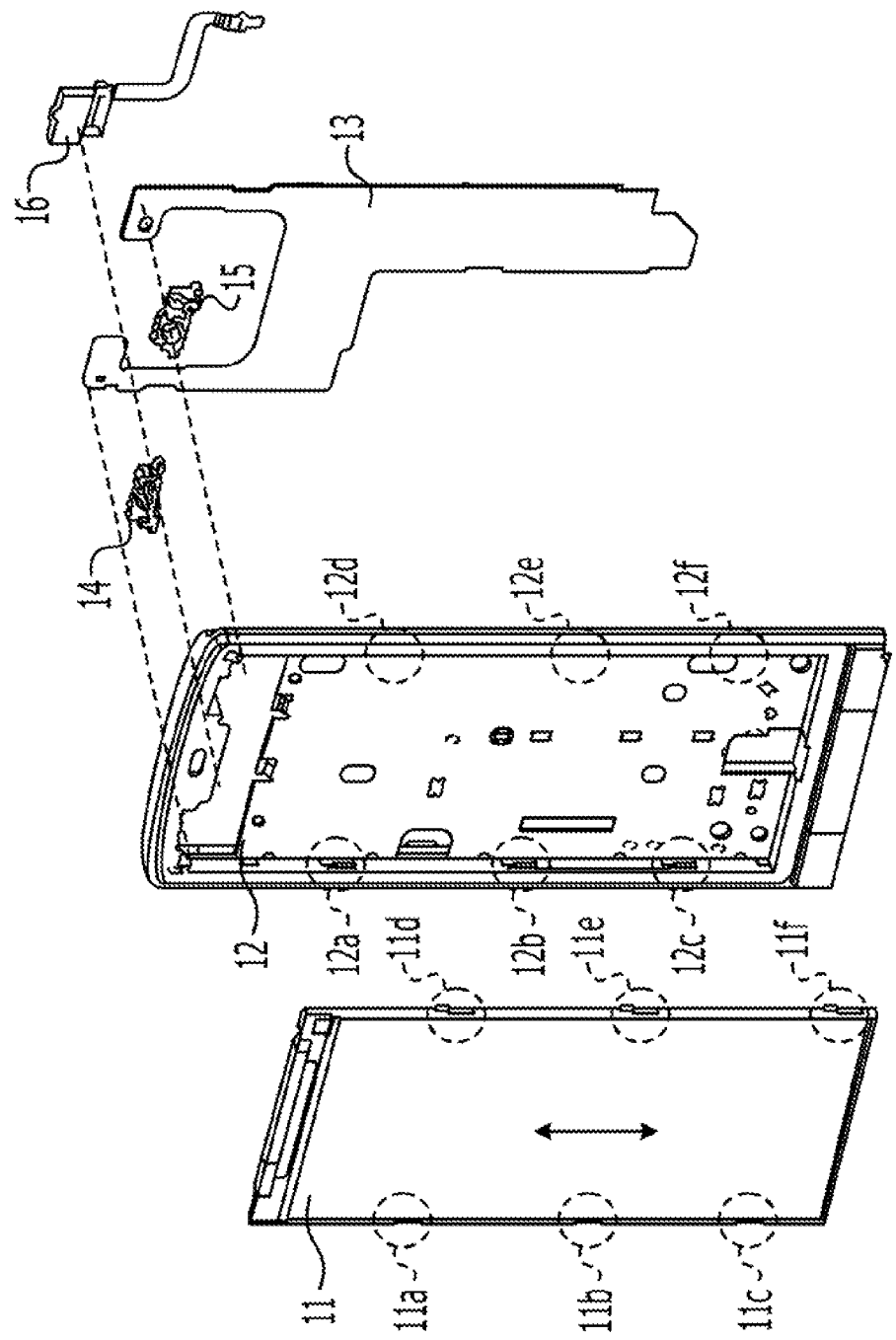
FIG. 3 is an exploded perspective view of an exemplary movable side housing illustrated in FIGS. 1 and 2.

With reference to FIG. 3, the following will describe an internal configuration of the movable side housing 10 illustrated in FIGS. 1 and 2. FIG. 3 is an exploded perspective view of the movable side housing illustrated in FIGS. 1 and 2. As illustrated in FIG. 3, the movable side housing 10 has the LCD module 11, a case 12, and a board 13.

Figure 4:
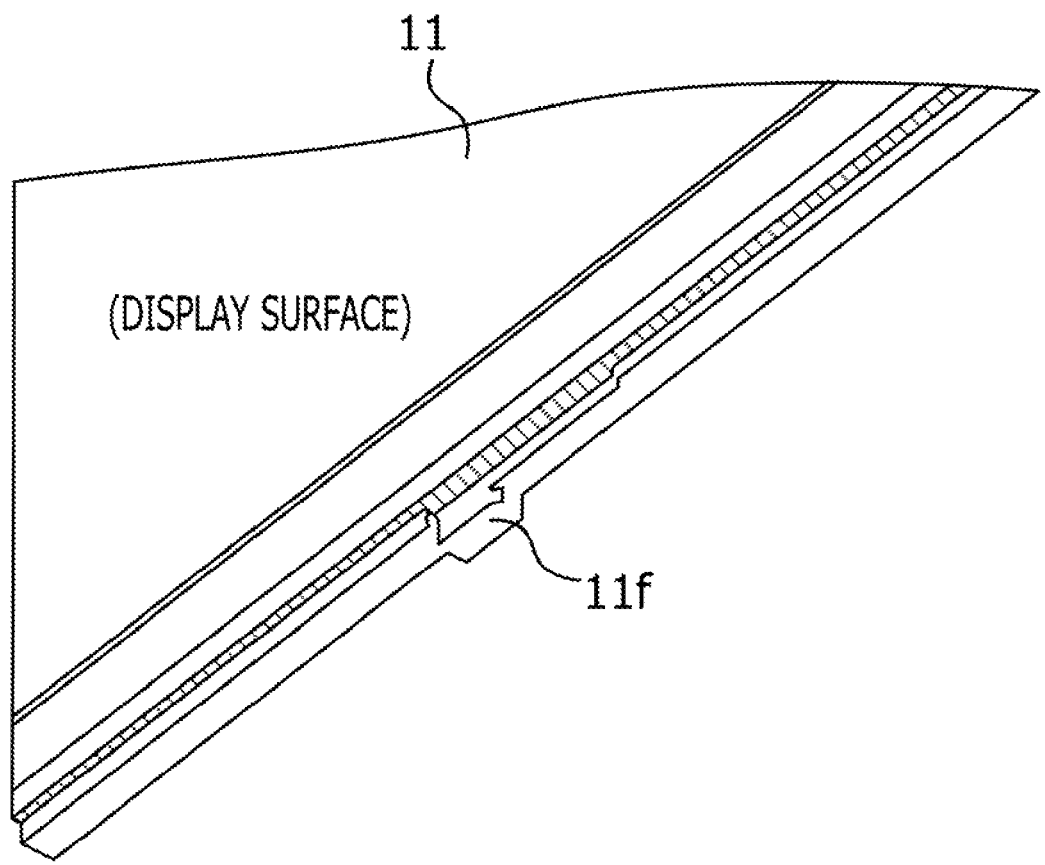
FIG. 4 is an enlarged view of an exemplary display unit side engaging latch.

The LCD module 11 is a display unit that displays characters and images, and has display unit side engaging latches 11a to 11f. FIG. 4 is an enlarged view of the display unit side engaging latch. FIG. 4 illustrates an enlarged view of the display unit side engaging latch 11f illustrated in FIG. 3. As illustrated in FIG. 4, the display unit side engaging latch 11f is formed on a side surface of the LCD module 11 in such a shape as to project outwardly therefrom. When a display surface on which characters and images are displayed is on an upper side, the display unit side engaging latch 11f is formed at a position in a lower portion of the side surface of the LCD module 11.

Although FIG. 4 illustrates the enlarged view of the display unit side engaging latch 11f illustrated in FIG. 3, the display unit side engaging latches 11a to 11e have the same shape as the display unit side engaging latch 11f, although other shapes may be used. Specifically, the display unit side engaging latches 11a to 11f are formed at positions in a lower portion of side surfaces of the LCD module 11 in such a shape as to project outwardly therefrom.

Figure 5:
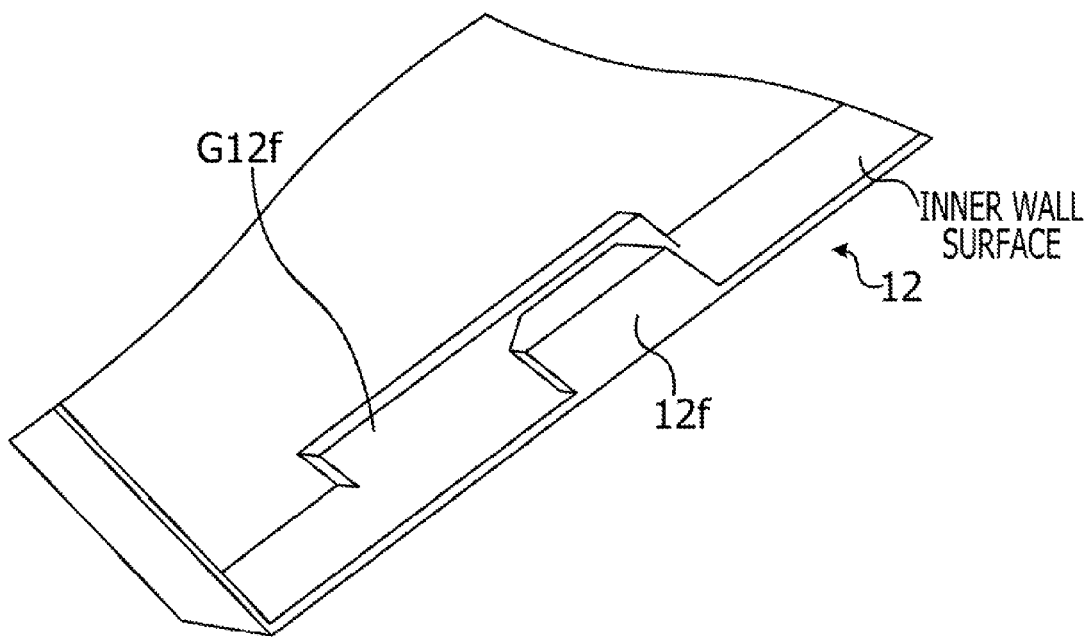
FIG. 5 is an enlarged view of an exemplary case side engaging latch.

The case 12 is a member to which the LCD module 11, the board 13, and the like are mounted, and has case side engaging latches 12a to 12f. FIG. 5 is an enlarged view of the case side engaging latch. As illustrated in FIG. 5, the case side engaging latch 12f is formed on an inner wall surface of the case 12 in such a shape as to project inwardly therefrom. When the display surface of the LCD module 11 is on an upper side after being mounted, the case side engaging latch 12f is formed at a position in an upper portion of the inner wall surface of the case 12. As illustrated in FIG. 5, the case 12 has a slide groove G12f on the lower side of the case side engaging latch 12f, that is, in a lower portion of the inner wall surface of the case 12. The slide groove G12f allows the display unit side engaging latch 11f to slide therein.

Although FIG. 5 illustrates the enlarged view of the case side engaging latch 12f illustrated in FIG. 3, the case side engaging latches 12a to 12e may also have the same shape as the case side engaging latch 12f. The case side engaging latches 12a to 12f are formed at positions in the upper portion of the inner wall surface of the case 12 in such a shape as to project inwardly therefrom. The case 12 has, on the lower side, case side engaging latches 12a to 12f, that is, in the lower portion of the inner wall surface of the case 12, slide grooves that allow the display unit side engaging latches 11a to 11f to slide therein, respectively.

FIG. 3 illustrates an example where the LCD module 11 has the six display unit side engaging latches 11a to 11f and the case 12 has the six case side engaging latches 12a to 12f. The number of the display unit side engaging latches of the LCD module 11 and the number of the case side engaging latches of the case 12 are not limited to the example illustrated in FIG. 3. For example, the LCD module 11 may have ten display unit side engaging latches, and the case 12 may have ten case side engaging latch. One display unit side engaging latch engages one case side engaging latch. Thus, the number of the display unit side engaging latches of the LCD module 11 is desirably the same as the number of the case side engaging latches of the case 12.

A GPS frame 14, an illuminance sensor frame 15, a receiver 16, and the like are mounted to the board 13. For example, the GPS frame 14, the illuminance sensor frame 15, and the like are mounted to the board 13 by a double-sided adhesive tape. The board 13 to which the GPS frame 14, the illuminance sensor frame 15, the receiver 16, and the like are mounted, is mounted to the case 12.

The GPS frame 14 is a component that obtains location information of the mobile phone 1, information concerning standard time, and the like. The illuminance sensor frame 15 is a component that obtains an ambient illuminance of the mobile phone 1. For example, the mobile phone 1 controls activation of a backlight of the LCD module 11 in accordance with an illuminance obtained by the illuminance sensor frame 15. The receiver 16 is a component that receives a signal from the outside.

Figure 6:
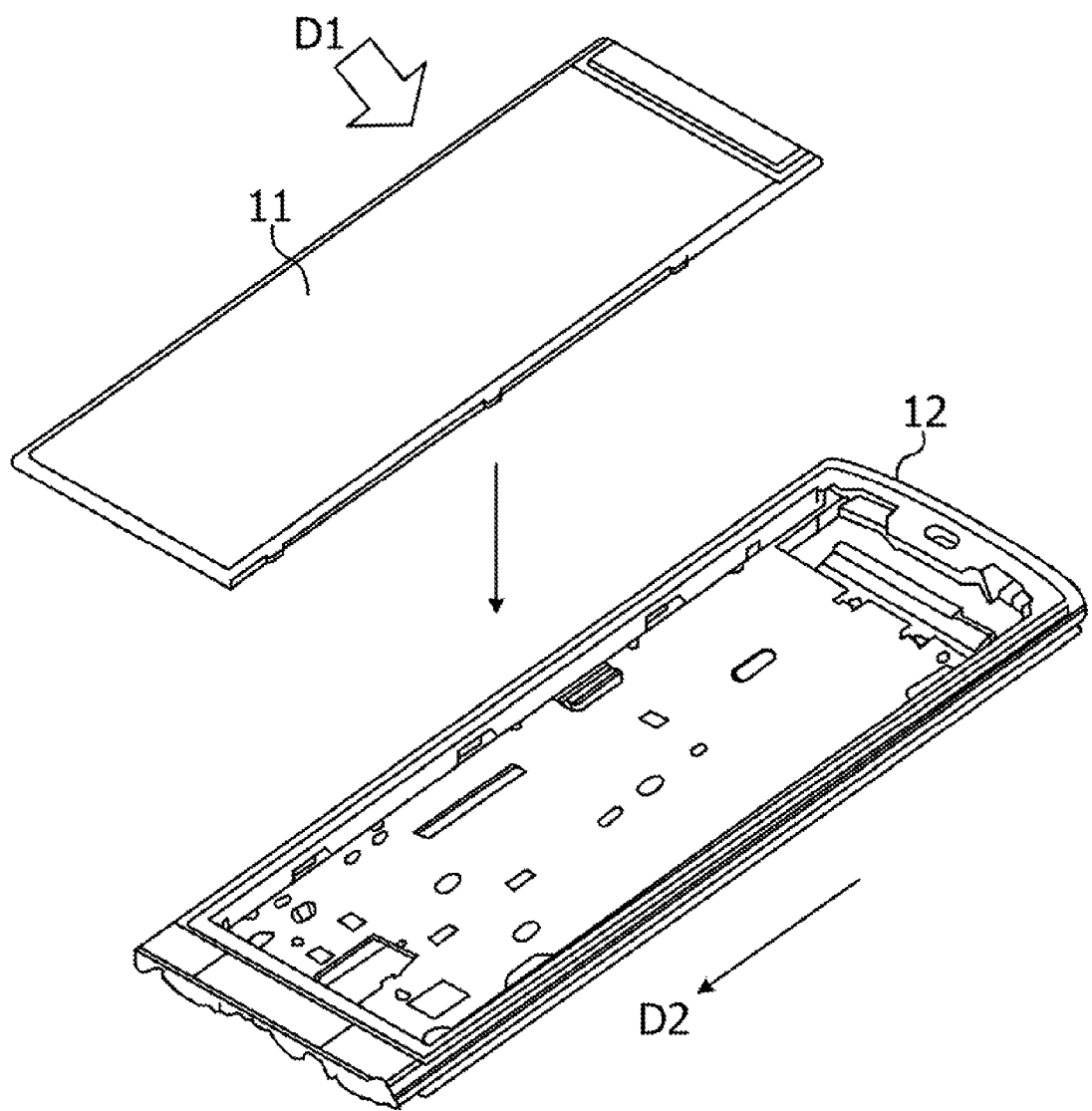
FIG. 6 is a view for illustrating an exemplary method of mounting an LCD module to a case.

With reference to FIGS. 6, 7A, and 7B, the following will describe a method of mounting the LCD module 11 to the case 12. FIG. 6 is a view illustrating a method of mounting the LCD module 11 to the case 12. FIGS. 7A and 7B are views illustrating the method of mounting the LCD module 11 to the case 12. FIGS. 7A and 7B are views of the LCD module 11 and the case 12, as seen from an arrow D1 in FIG. 6. FIGS. 7A and 7B are views when the LCD module 11 and the case 12 illustrated in FIG. 6 are seen from a position facing the display surface of the LCD module 11.

As illustrated in FIG. 6, the LCD module 11 is put on the case 12. According to the embodiment, the LCD module 11 is not press-fitted into the case 12, but is put on the case 12 such that the display unit side engaging latches are put on the slide grooves of the case 12, although other methods may also be used. As illustrated in FIG. 7A, the LCD module 11 is put on the case 12 such that the display unit side engaging latches 11a to 11f do not overlap the case side engaging latches 12a to 12f. In the example illustrated in FIG. 7A, the display unit side engaging latches 11a to 11f are put on the slide grooves of the case 12.

The LCD module 11 is slid in a direction D2 illustrated in FIGS. 6 and 7A. The LCD module 11 slides on the case 12 as the display unit side engaging latches 11a to 11f slide in the slide grooves of the case 12. The LCD module 11 is slid until the display unit side engaging latches 11a to 11f engage the case side engaging latches 12a to 12f as illustrated in FIG. 7B.

The mobile phone 1 according to the embodiment is mounted to the case 12 by the LCD module 11 being slid. In the mobile phone 1 according to the embodiment, unlike the case where the LCD module 11 is mounted to the case 12 by being press-fitted into the case 12 as in an existing mobile phone, stress is not applied to the LCD module 11 when the LCD module 11 is mounted. In the mobile phone 1 according to the embodiment, the LCD module 11 can be prevented from being broken when the LCD module 11 is mounted.

As illustrated in FIGS. 6 and 7A, when the LCD module 11 is slid to be mounted to the case 12, a slide region is secured. Thus, a problem is considered, that the movable side housing 10 is lengthened in the slide direction. The mobile phone 1 according to the embodiment may solve this problem. This will be described with reference to FIGS. 8A and 8B.

Figure 8A:
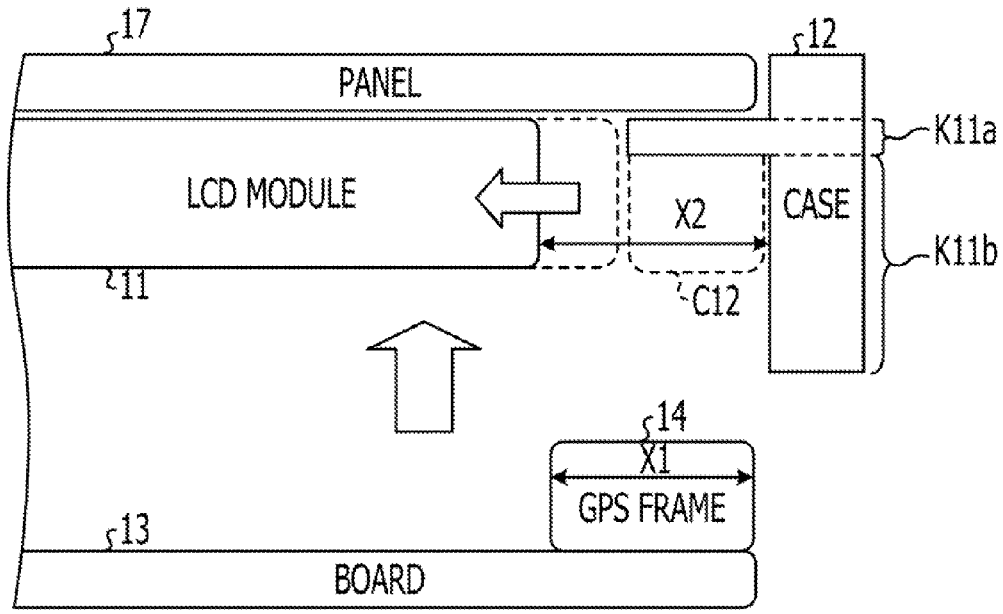
FIGS. 8A and 8B are cross-sectional views taken along the line I-I, as seen from an arrow B3 in FIG. 1.
Figure 8B:
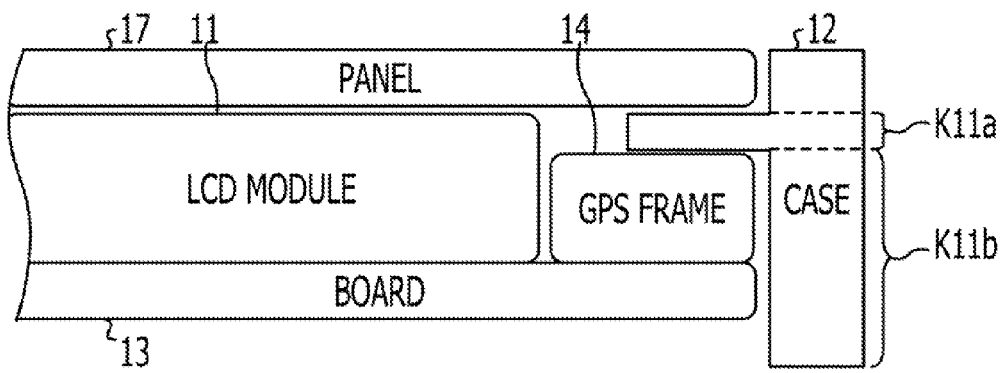

FIGS. 8A and 8B are cross-sectional views taken along the line I-I, as seen from an arrow B3 in FIG. 1. In the movable side housing 10 illustrated in FIGS. 8A and 8B, the GPS frame 14 is mounted at a portion indicated by the line I-I. As illustrated in FIG. 8A, the LCD module 11 is mounted to the case 12 by being slid.

As illustrated in FIGS. 8A and 8B, the case 12 is formed in a shape including: a first wall portion K11a whose thickness in the slide direction of the LCD module 11 is a predetermined dimension; and a second wall portion K11b whose thickness in the slide direction is smaller than thickness of the first wall portion K11a. This will be described in comparison to the existing case 92 illustrated in FIG. 15A. In the case 12, a side on which a panel 17 is mounted is an upper side, and a side on which the board 13 is mounted is a lower side.

In an upper portion of a side wall of the case 12 in the embodiment, the first wall portion K11a is formed, on which the panel 17 is put. The thickness of the first wall portion K11a may be the same as the thickness of the side wall of the existing case 92. In a lower portion of the side wall of the case 12 in the embodiment, the second wall portion K11b is formed, whose thickness in the slide direction is smaller than the thickness of the first wall portion K11a. The case 12 in the embodiment is formed in a shape in which the lower portion of the side wall is cut further, as compared to that in the existing case 92. Thus, a space C12 is provided in the case 12.

In the mobile phone 1 according to the embodiment, a component such as the GPS frame 14 is set in the space C12 and the slide region of the LCD module 11. As illustrated in FIG. 8B, the component such as the GPS frame 14 is set in the space C12 provided in the side wall of the case 12 and in a gap that appears between the case 12 and the LCD module 11 as a result of sliding the LCD module 11.

Figure 15A:
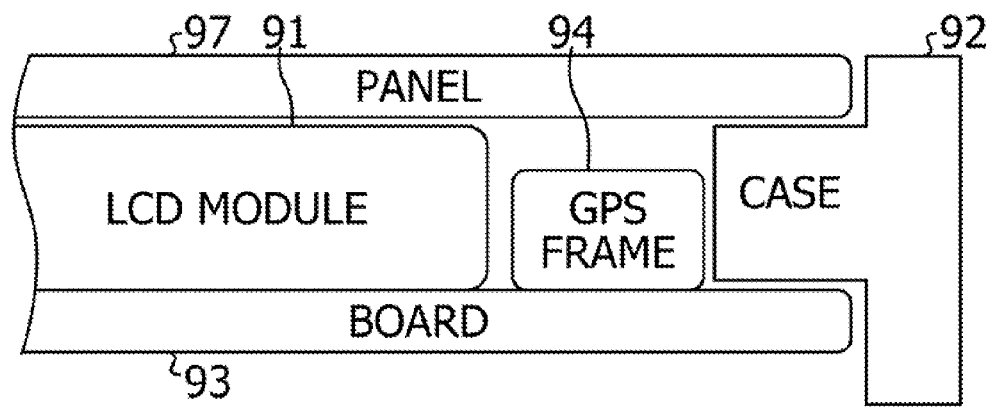
FIGS. 15A and 15B are cross-sectional views taken along the line II-II, as seen from an arrow B2 in FIG. 12.
Figure 15B:
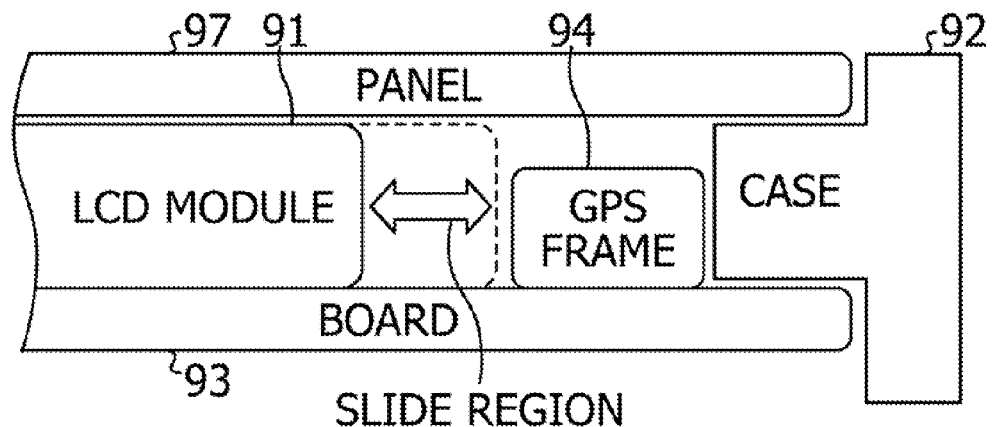

In the mobile phone 1 according to the embodiment, as seen from comparison to the example illustrated in FIGS. 15A and 15B, even when the LCD module 11 is slid to be mounted to the case 12, the movable side housing 10 may be prevented from being lengthened in the slide direction. In the example illustrated in FIG. 15B, since the region for sliding the LCD module 91 is secured, the movable side housing 90 is lengthened in the slide direction. In the mobile phone 1 according to the embodiment, after the LCD module 11 is slid, the board 13 is mounted to the case 12 such that a component is set in the slide region that is the gap appearing as a result of sliding the LCD module 91 and in the space C12 provided in the case 12. Thus, in the mobile phone 1 according to the embodiment, the movable side housing 10 may not be increased in size.

In the example illustrated in FIG. 8A, the GPS frame 14 is formed such that a dimension X1 thereof is substantially the same as the sum of: a dimension of the slide region appearing as a result of the slide of the LCD module 11; and a dimension X2 of the space C12 of the case 12 in the slide direction. Thus, in the mobile phone 1 according to the embodiment, the position of the LCD module 11 in the slide direction can be fixed by the GPS frame 14.

When the LCD module 11 is mounted to the case 12, since the LCD module 11 is movable in the slide direction, the position of the LCD module 11 in the slide direction is fixed. In the mobile phone 1 according to the embodiment, since the dimension X1 of the GPS frame 14 is substantially the same as the sum of the dimension of the slide region and the dimension X2 of the space C12, the position of the LCD module 11 can be fixed without using a dedicated component for fixing the position of the LCD module 11.

In FIGS. 8A and 8B, the example has been described, where the GPS frame 14 is received in the case 12. However, a component other than the GPS frame 14 may be received in the case 12. For example, a component such as the illuminance sensor frame 15 or the receiver 16 may be received in the slide region and the space C12. A plurality of components such as the GPS frame 14, the illuminance sensor frame 15, and the receiver 16 may also be received in the slide region and the space C12.

Figure 9:
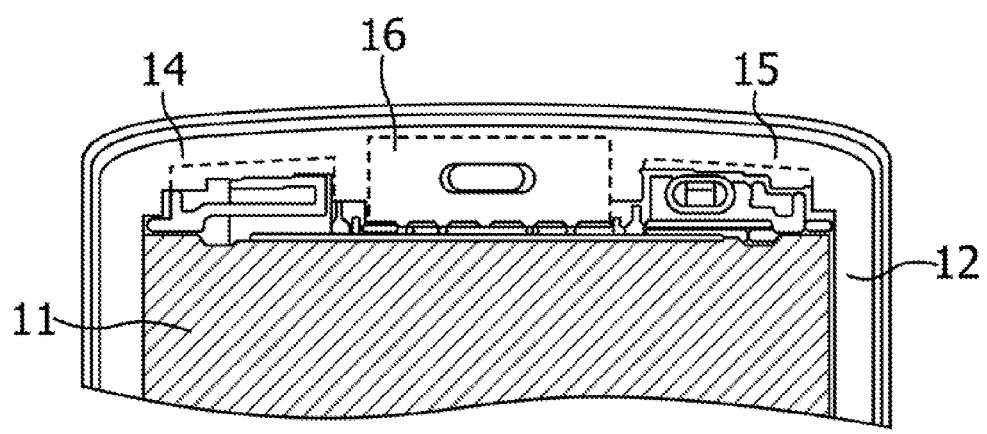
FIG. 9 is a view illustrating an example where a GPS frame, an illuminance sensor frame, and a receiver are received in a case.

FIG. 9 is a view illustrating an example where the GPS frame 14, the illuminance sensor frame 15, and the receiver are received in the case. In the example illustrated in FIG. 9, the GPS frame 14, the illuminance sensor frame 15, and the receiver 16 are received in the slide region of the LCD module 11 and the space C12 of the case 12. In the mobile phone 1 illustrated in FIG. 9, the position of the LCD module 11 in the slide direction is fixed by the GPS frame 14, the illuminance sensor frame 15, and the receiver 16.

Figure 10:
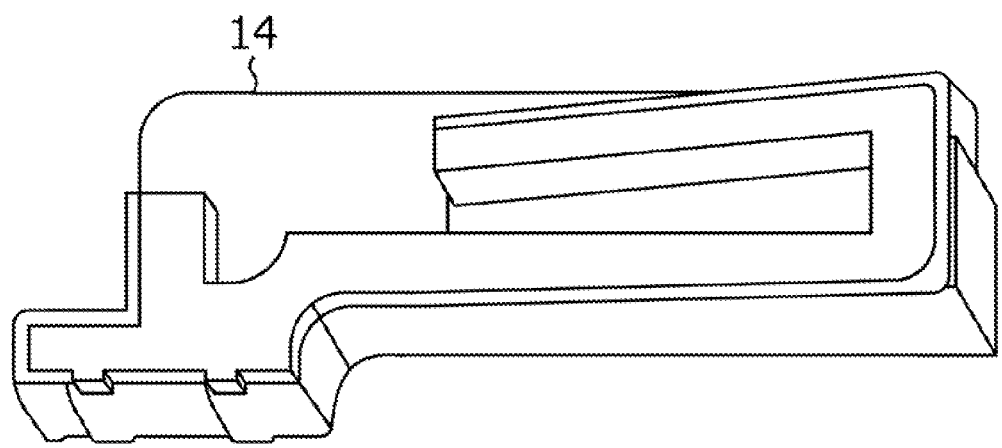
FIG. 10 is an enlarged view of the GPS frame.
Figure 11:
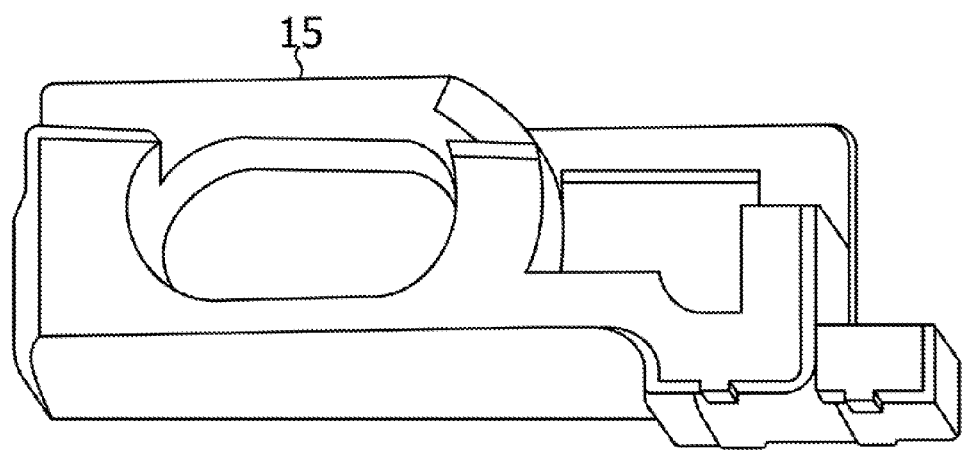
FIG. 11 is an enlarged view of the illuminance sensor frame.
Figure 12:
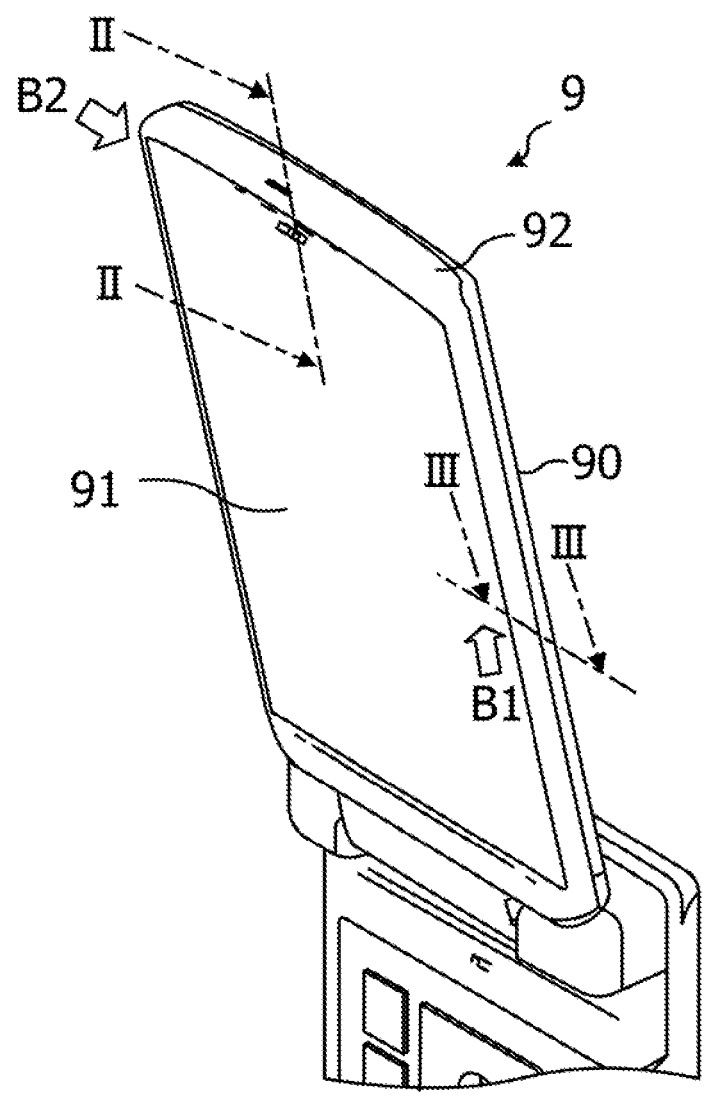
FIG. 12 is an external perspective front view of an existing mobile phone.
Figure 13:
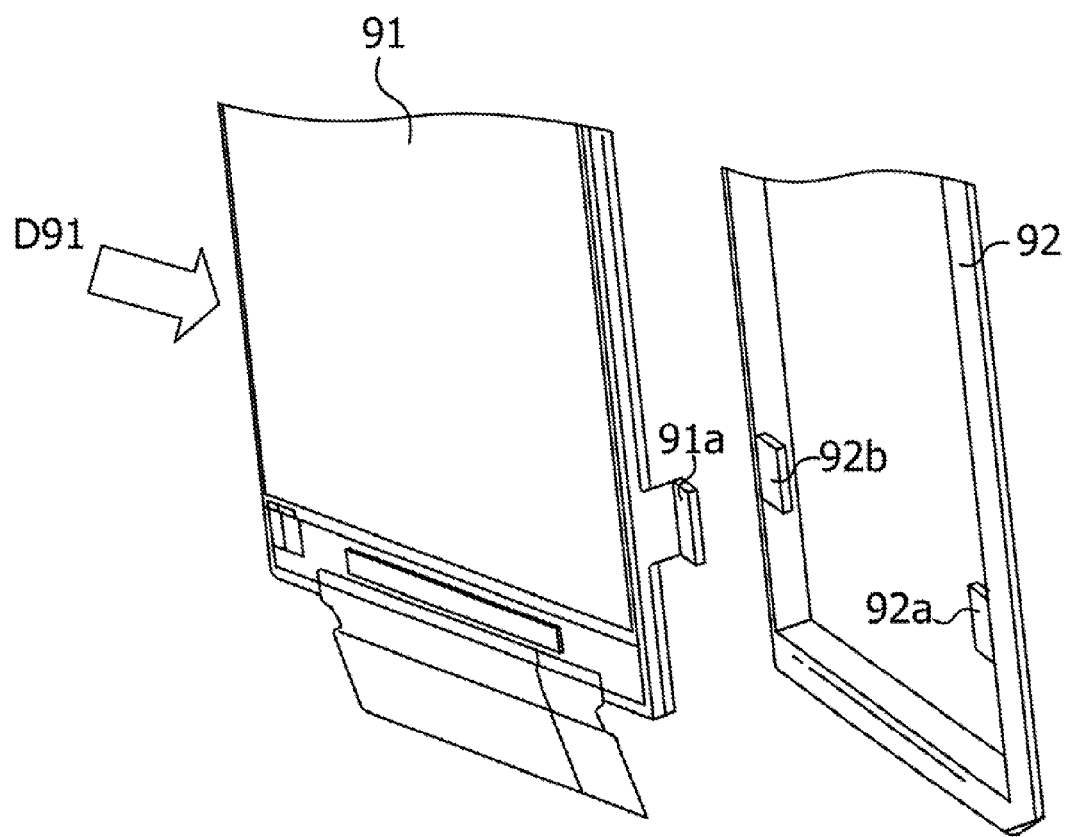
FIG. 13 is a view for illustrating one example of an existing method of mounting an LCD module to a case.
Figure 14:
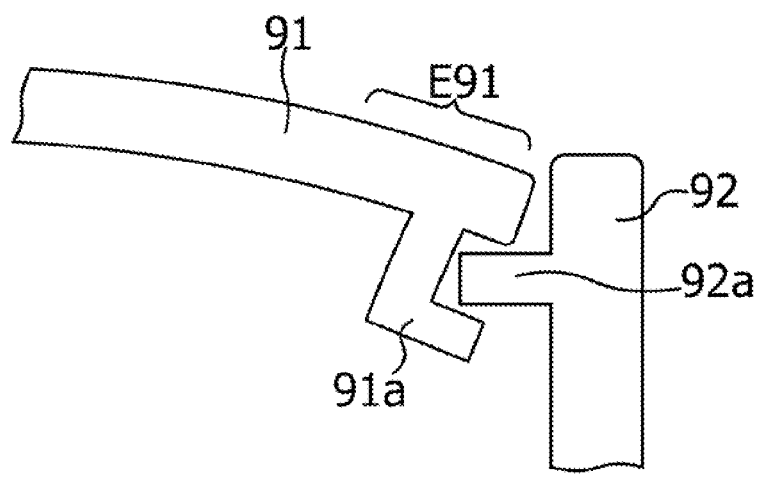
FIG. 14 is a cross-sectional view taken along the line III-III, as seen from an arrow B1 in FIG. 12.

FIG. 10 is an enlarged view of the GPS frame 14. FIG. 11 is an enlarged view of the illuminance sensor frame 15. The GPS frame 14 illustrated in FIG. 10 and the illuminance sensor frame 15 illustrated in FIG. 11 are formed in such shapes as to be able to be received in the slide region of the LCD module 11 and the space C12 of the case 12. In the embodiment, the receiver 16 is also formed in such a shape as to be able to be received in the slide region of the LCD module 11 and the space C12 of the case 12.

With reference to FIGS. 3, 6, 7A, 7B, 8A, and 8B, the following will describe a procedure of connecting the LCD module 11, the case 12, and the board 13.

(1) As illustrated in FIGS. 6, 7A, and 7B, the LCD module 11 is put on the case 12.

(2) The LCD module 11 is slid until the display unit side engaging latches 11a to 11f engage the case side engaging latches 12a to 12f.

(3) The board 13 to which components such as the GPS frame 14 are mounted, is mounted to the case 12. As illustrated in FIG. 8A, a component is located in the slide region appearing as a result of the slide of the LCD module 11 and in the space C12 of the case 12.

The mobile phone 1 according to the embodiment has: the LCD module 11 having the display unit side engaging latches; and the case 12 having the slide grooves that allow the display unit side engaging latches to slide therein and the case side engaging latches 12a-12f that engage the display unit side engaging latches 11a-11f. In the mobile phone 1 according to the embodiment, the LCD module 11 is mounted to the case 12 by the display unit side engaging latches sliding 11a-11f in the slide grooves of the case 12.

In the mobile phone 1 according to the embodiment, unlike the case where the LCD module 11 is mounted to the case 12 by being press-fitted into the case 12 as in an existing mobile phone, the LCD module 11 may not be deformed when the LCD module 11 is mounted. In the mobile phone 1 according to the embodiment, the LCD module 11 may not be broken when the LCD module 11 is mounted.

In the mobile phone 1 according to the embodiment, the component is located in the gap appearing between the case 12 and the LCD module 11 as a result of the slide of the LCD module 11. In the mobile phone 1 according to the embodiment, even when the LCD module 11 is slid to be mounted to the case 12, the movable side housing 10 may not be increased in size.

In the mobile phone 1 according to the embodiment, the case 12 including the thick wall portion K11a and the thin wall portion K11b whose thickness in the slide direction is smaller than that of the thick wall portion K11a, is used as illustrated in FIGS. 8A and 8B. In the mobile phone 1 according to the embodiment, the movable side housing 10 may not be increased in size.

The example of the mobile phone 1 using the case 12 that includes the thick wall portion K11a and the thin wall portion K11b, is also applicable to a waterproof mobile phone. In the waterproof mobile phone, in order to be waterproof, the side wall of a case is thicker than that of a non-waterproof mobile phone. In the case of the waterproof mobile phone, as in the example illustrated in FIGS. 8A and 8B, the side wall, other than the surface at which the case and the panel are joined, may be thin. The mobile terminal device disclosed in the present application is useful particularly when being applied to a waterproof mobile phone.

In the mobile phone 1 according to the embodiment, in the gap appearing between the case 12 and the LCD module 11 as a result of the slide of the LCD module 11, a component whose dimension is substantially the same as that of the gap, is located. In the mobile phone 1 according to the embodiment, the position of the LCD module 11 in the slide direction may be fixed.

In the mobile phone 1 according to the embodiment, the display unit may not be broken while the housing may not be increased in size.

The embodiment of the mobile terminal device disclosed in the present application has been described. However, in addition to the above embodiment, the mobile terminal device disclosed in the present application may be implemented in various different embodiments.

In the embodiment, the foldable mobile terminal device having the movable side housing 10 and the fixed side housing 20, has been described as an example. The mobile terminal device disclosed in the present application is also applicable to a mobile terminal device other than foldable type. For example, the mobile terminal device disclosed in the present application is similarly applicable to a mobile phone in which a movable side housing is movable relative to a fixed side housing by a connection part of slide type or plane rotation type.

In the embodiment, the example of application to the mobile phone as the mobile terminal device has been described. However, the mobile terminal device disclosed in the present application is not limited thereto. For example, the mobile terminal device disclosed in the present application is also applicable to various other mobile terminal devices, e.g., small-size information processing terminals such as PDAs, small-size music reproduction apparatuses, mobile televisions, and hand-held video game machines.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile terminal device comprising:
    a display unit having a first engaging latch;
    a case having a slide groove that allows the first engaging latch to slide therein and a second engaging latch that engages the first engaging latch that slides in the slide groove; and
    a component located in a gap that appears between the case and the display unit as a result of sliding the first engaging latch in the slide groove.

2. The mobile terminal device according to claim 1, wherein
    the case has a first wall portion whose thickness in a slide direction of the display unit is a predetermined dimension and a second wall portion whose thickness in the slide direction is smaller than the thickness of the first wall portion, and
    the component is located in a gap between the second wall portion and the display unit.

3. The mobile terminal device according to claim 1, wherein a dimension of the component in a slide direction is substantially the same as a dimension of the gap between the case and the display unit in the slide direction.

4. The mobile terminal device according to claim 1, wherein the component comprises an electronic component.

5. The mobile terminal device according to claim 4, wherein the electronic component comprises any one of a Global Positioning System component, an illuminance sensor component, and a receiver component.

6. A method of assembling a mobile terminal device comprising:
    providing a display unit having a first engaging latch;
    providing a case having a slide groove and a second engaging latch;
    sliding the first engaging latch in the slide groove to engage the first engaging latch and the second engaging latch in the slide groove; and
    setting a component in a gap that appears between the case and the display unit as a result of the sliding.

7. The method according to claim 6, wherein
    the case has a first wall portion whose thickness in a slide direction of the display unit is a predetermined dimension and a second wall portion whose thickness in the slide direction is smaller than the thickness of the first wall portion, and the component is located in a gap between the second wall portion and the display unit.

8. The method according to claim 6, wherein a dimension of the component in a slide direction is substantially the same as a dimension of the gap between the case and the display unit in the slide direction.

9. The method according to claim 6, wherein the component comprises an electronic component.

10. The method according to claim 9, wherein the electronic component comprises any one of a Global Positioning System component, an illuminance sensor component, and a receiver component.

* * * * *